United States Patent
Scherzer et al.

(10) Patent No.: US 9,450,949 B2
(45) Date of Patent: Sep. 20, 2016

(54) METHOD FOR COMPUTER ACCESS CONTROL BY MEANS OF MOBILE END DEVICE

(71) Applicant: GIESECKE & DEVRIENT GMBH, Munich (DE)

(72) Inventors: Helmut Scherzer, Tubingen (DE); Klaus Finkenzeller, Unterfohring (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/381,650

(22) PCT Filed: Feb. 26, 2013

(86) PCT No.: PCT/EP2013/000561
§ 371 (c)(1),
(2) Date: Aug. 28, 2014

(87) PCT Pub. No.: WO2013/127521
PCT Pub. Date: Sep. 6, 2013

(65) Prior Publication Data
US 2015/0026790 A1    Jan. 22, 2015

(30) Foreign Application Priority Data
Feb. 28, 2012   (DE) .................. 10 2012 003 886

(51) Int. Cl.
*H04L 29/06*   (2006.01)
*G06F 21/35*   (2013.01)

(52) U.S. Cl.
CPC ........... *H04L 63/0823* (2013.01); *G06F 21/35* (2013.01); *H04L 63/0853* (2013.01)

(58) Field of Classification Search
CPC ...................................... G06F 21/35
USPC ............................................... 726/10
See application file for complete search history.

(56) References Cited

U.S. PATENT DOCUMENTS

| | | | |
|---|---|---|---|
| 9,075,979 B1* | 7/2015 | Queru | G06F 21/34 |
| 2005/0105734 A1* | 5/2005 | Buer | G06F 21/35 |
| | | | 380/270 |

(Continued)

FOREIGN PATENT DOCUMENTS

| | | |
|---|---|---|
| DE | 102004036366 A1 | 3/2006 |
| DE | 102004036374 A1 | 3/2006 |
| EP | 1280112 A1 | 1/2003 |
| EP | 2063380 A2 | 5/2009 |
| WO | 2007122439 A1 | 11/2007 |

OTHER PUBLICATIONS

German Search Report for corresponding German Application No. 102012003886.0, Nov. 5, 2012.

(Continued)

*Primary Examiner* — Andrew Nalven
*Assistant Examiner* — Khang Do
(74) *Attorney, Agent, or Firm* — Workman Nydegger

(57) ABSTRACT

A method for access control to a computer with a mobile end device relies on using contactless interfaces. An authentication to the computer is carried out with the mobile end device and upon a successful authentication the access to the computer is granted or maintained. For preparing the authentication, a certificate is loaded into the mobile end device from a portable data carrier separate from the mobile end device. For authentication, authentication data comprising the certificate or obtained from the certificate are provided to the computer from the mobile end device via the contactless interfaces.

7 Claims, 1 Drawing Sheet

(56) References Cited

U.S. PATENT DOCUMENTS

| | | |
|---|---|---|
| 2006/0010325 A1 | 1/2006 | Liu et al. |
| 2006/0143706 A1 | 6/2006 | Kawasaki et al. |
| 2006/0265598 A1* | 11/2006 | Plaquin .............. H04L 63/0892 713/182 |
| 2008/0034444 A1* | 2/2008 | Sears ..................... A63F 13/12 726/29 |
| 2008/0127311 A1 | 5/2008 | Yasaki et al. |
| 2009/0198618 A1* | 8/2009 | Chan ..................... G06Q 20/02 705/66 |
| 2010/0023757 A1* | 1/2010 | Nguyen-Huu ......... H04L 12/58 713/156 |
| 2011/0219250 A1* | 9/2011 | Hitaka .................... G06F 1/32 713/323 |

OTHER PUBLICATIONS

International Search Report for corresponding International PCT Application No. PCT/EP2013/000561, Apr. 25, 2013.

Menezes et al., "Handbook of Applied Cryptography," Handbook of Applied Cryptography: CRC Press Series on Discrete Mathematics and its Applications, Jan. 1, 1997, pp. 400-405, CRC Press, Boca Raton, Florida USA.

NFC Forum, "Essentials for Successful NFC Mobile Ecosystems," NFC Forum, Oct. 2008.

* cited by examiner

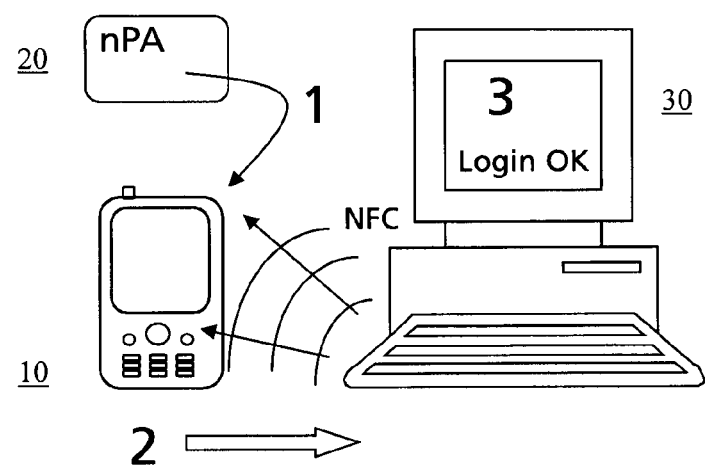

METHOD FOR COMPUTER ACCESS CONTROL BY MEANS OF MOBILE END DEVICE

BACKGROUND

The invention relates to a method for access control to a computer by means of a mobile end device, according to the preamble of claim 1, in particular as described in DE 10 2004 036 366 A1. A mobile end device is understood to be a mobile phone, smart phone or similar device.

For safeguarding the access to a computer, e.g. workstation computer, PC, server, notebook, tablet PC or the like, there is normally requested an authentication of the user to the computer, for example by entering a PIN (personal identification number). Upon the successful authentication the user is granted access to the computer.

A PIN must be remembered by the user and is thus often forgotten or trifled with, e.g. noted down in a fashion that can be spied out.

In favor of the user-friendliness, compared to the usage of a PIN, it is proposed in the prior art to employ mobile phones for access control to computers.

DE 10 2004 036 366 A1 and DE 10 2004 036 374 A1 disclose methods for accessing resources or firmware of a computer, wherein as soon as a Bluetooth-capable mobile phone is brought into the capture region of a Bluetooth radio-interface (e.g. USB Bluetooth stick) of the computer an authentication is carried out and access is granted. Theft of the switched-on mobile phone makes possible abusive access to the computer. DE 10 2004 036 366 A1 is assumed to be the closest prior art.

EP 2 063 380 A2 discloses a user-friendly method for access control to a PC or similar device having an RFID reader by means of a mobile phone having an NFC module (referred to as "third application possibility"). A user brings the mobile phone in a primary response region of the PC, authenticates himself and removes the mobile phone from the primary response region. As long as the mobile phone is outside the primary, but within a larger, secondary response region of the PC, the user is assumed to be present at the PC. Only upon leaving also the secondary response region e.g. the keyboard of the PC is blocked or the screen saver is activated and for the access to the PC a new authentication is required. If the user inadvertently leaves the secondary response region, e.g. when he walks back and forth with the mobile phone in the room during a phone call, a new authentication is required.

Under the designation ARM trustzone architecture there is known a two-part runtime architecture of the company ARM for a microprocessor system, which architecture comprises two runtime environments. A first insecure runtime environment, referred to as "normal zone" or "normal world", is controlled by a normal operating system. A second secured or trustworthy runtime environment, referred to as "trustzone" or "trusted world" or "secure world", is controlled by a security operating system.

The normal operating system can be for example a common operating system, such as Android, Windows Phone, Symbian or the like.

The applicant of the present patent application manufactures and sells under the brand name MOBICORE a security operating system for chips to be implemented into mobile end devices.

SUMMARY

The invention is based on the object to create a particularly user-friendly and at the same time secure method for access control to a computer by means of a mobile end device.

The method according to claim 1 is arranged for access control to a computer by means of a mobile end device, the mobile end device and the computer each comprising a contactless interface. Using the contactless interfaces, an authentication to the computer is carried out with the mobile end device and upon a successful authentication the access to the computer is granted or maintained. The method is characterized in that for preparing the authentication, a certificate is loaded into the mobile end device from a portable data carrier separate from the mobile end device, and that for authentication, authentication data comprising the certificate or obtained from the certificate are made available to the computer from the mobile end device via the contactless interfaces.

The user does not have to remember access data such as e.g. a PIN or a password here. Due to the fact that first the certificate is loaded into the end device from the data carrier, it is guaranteed, on the other hand, that the loss of the switched-on end device does not immediately automatically make possible the access to the computer. The method is thus more secure than e.g. the methods of DE 10 2004 036 366 A1 and DE 10 2004 036 374 A1.

Therefore, according to claim 1 there is created a particularly user-friendly and at the same time secure method for access control to a computer by means of a mobile end device.

Upon carrying out the authentication for the first time, the access to the computer is preferably granted, e.g. the login to the computer is carried out. Upon a repeated carrying out of the authentication, the access to the computer is preferably maintained, e.g. the login on the computer is maintained.

As contactless interfaces there are provided NFC interfaces for example in the end device and at the computer, selectively firmly integrated or attached. In particular in the computer the contactless interface can be provided in a separate pluggable or plugged token, e.g. USB token.

Selectively,
- by the contactless interface of the computer there is sent at least one authentication invitation or/and are preferably sent authentication invitations in regular time intervals, and
- upon the receiving, by the contactless interface of the mobile end device, of an authentication invitation or preferably upon each receiving, by the contactless interface of the mobile end device, of an authentication invitation, the authentication data are made available to the computer from the mobile end device.

As soon as the mobile end device is in the capture region of the contactless interface of the computer, it can thus receive an authentication invitation of the computer. In reaction to the receipt of an authentication invitation, the carrying out of the authentication is directly prompted.

In the preferred case, namely that authentication invitations are sent in regular time intervals, the computer, in other words, carries out a polling method for presence detection vis-à-vis the mobile end device, in order to grant access to the computer upon a first successful authentication and to maintain it upon subsequent successful authentications.

The time interval between two successive authentication invitations selectively lies in the time range of 10 seconds to 5 minutes, selectively in the time range of 30 seconds to 5 minutes, for example at approximately 1 minute or 2 minutes or 3 minutes.

If in reaction to an authentication invitation no or false authentication data are received at the computer, the access to the computer is preferably blocked—in particular, if it has just been granted—, or at least not granted.

According to a development,
  by the contactless interface of the computer there is sent at least one authentication invitation or/and are preferably sent authentication invitations in regular time intervals, and
  upon the receiving, by the contactless interface of the mobile end device, of an authentication invitation or of at least some authentication invitations, a user input is requested, upon the entering of the requested user input into the end device the authentication data being made available to the computer from the mobile end device.

According to the development, for one or some authentication invitations, the receipt of an authentication invitation sent by the computer, e.g. polling message, leads only indirectly to the authentication in the end device. The authentication invitation provokes the output of a request to the user of the end device to perform an input at the end device, for example to actuate a key of the keyboard or an active touch field on the display. Only in reaction to the input at the end device the authentication is prompted and the authentication data are made available to the computer. As a result, the user of the end device has the possibility to actively make a declaration of will to obtain access at the computer.

Selectively, the authentication according to the development, with input at the end device by the user, is carried out upon a first authentication upon which the access to the computer is granted. Selectively, in case of subsequent authentications for maintaining the access to the computer, the authentication is carried out directly in reaction to the receipt of an authentication invitation without input by the user. Thus, it is sufficient, as soon as one has logged in on the computer (has reached a status access granted), to leave the mobile end device sufficiently close to the computer in order to remain logged in on the computer (in order to maintain the status access granted).

Selectively, all the authentications are effected without input by the user, e.g. directly in reaction to the receipt of an authentication invitation, in particular also that authentication by which the access is granted, i.e. by which the user is shifted from the logged-off state to the logged-in state. Such a method without input by the user is particularly user-friendly.

According to an advantageous configuration of the method, the certificate has a limited-time validity which is limited in time for a predetermined period of validity. A successful authentication with the certificate is possible only at most within the period of validity of the certificate. The limited-time validity of the certificate has the advantage that after the expiration of the certificate an access to the computer can no longer be established automatically. The period of validity of the certificate is for example 24 hours beginning with the day on which the certificate has been loaded into the mobile end device. Alternatively, the period of validity is for example one or several hours beginning with the loading of the certificate into the end device. During the period of validity the access to the computer is granted or/and maintained, as soon as or as long as the mobile end device is located in the capture region of the contactless interface of the computer, and where applicable, as soon as an authentication invitation has been additionally received whereupon an authentication has been carried out.

Selectively, upon an attempt of authentication which is carried out outside the period of validity of the certificate, it is requested that a certificate is loaded into the mobile end device anew, in particular loaded from a or the portable data carrier into the end device.

Selectively, while the authentication is carried out or/and while the authentication invitation is received the mobile end device is operated in a power-saving mode with restricted functionality of the end device, e.g. in a sleep mode, in which in particular the display of the end device is switched off. This avoids that upon the authentications always the complete functionality of the end device is supplied with energy. Thus, the energy source (accumulator) of the end device is only slightly used and remains serviceable for a long time, without having to be loaded with energy again.

Selectively, for authentication, in particular upon the receiving of an authentication invitation, the mobile end device is shifted from an extremely power-saving first mode, e.g. standby mode, with extremely restricted functionality of the end device to a second mode in which at least the carrying out of the authentication is possible. By the authentication invitation the end device is thus woken up and the authentication carried out. Preferably, the end device is shifted back to the first mode after the authentication. The second mode can here selectively also be already an energy-saving mode, e.g. sleep mode, in which e.g. the display is switched off. Operating the end device in a still more economical mode outside the authentications additionally saves energy.

Selectively, the mobile end device comprises a secured runtime environment and has e.g. the security operating system Mobicore implemented in an ARM architecture. In this case, the certificate is loaded into the mobile end device under the management of the secured runtime environment and the authentication data are made available to the computer under the management of the secured runtime environment. This prevents a tampering with the certificate in the end device. Selectively, the certificate and the authentication data in the end device are managed by a login application, a so-called login trustlet implemented under the security operating system.

Selectively, the contactless interfaces are operated using a per se known method for increasing the range, in particular peer-to-peer-mode or/and active load modulation. This allows the end device to be removed further from the computer without the end device being logged off the computer.

Selectively, as a portable data carrier there is employed an electronic identification document, e.g. electronic national identity card nPA or electronic passport ePass. Selectively, the certificate is created in the data carrier, e.g. nPA or ePass. Selectively, the certificate is employed directly as authentication data.

Selectively, the making available of the authentication data by the end device to the computer is prompted by an input at the end device. This variant is advantageous in particular for granting access, i.e. for logging in, and in particular in the case when the computer sends authentication invitations in longer regular time intervals. The user can thus immediately log in to the end device by means of the input and does not have to wait until the computer polls the end device. In particular, in this variant the input selectively provokes that the computer sends an authentication invitation to the end device, whereupon the end device sends the authentication data to the computer.

BRIEF DESCRIPTION OF THE DRAWINGS

In the following, the invention is explained in more detail on the basis of exemplary embodiments and with reference to the FIGURE, in which there is shown:

FIG. 1 a system for illustrating the invention.

DETAILED DESCRIPTION OF VARIOUS EMBODIMENTS

FIG. 1 shows a system for illustrating the invention. The system comprises an NFC-capable mobile end device 10, an electronic national identity card nPA as portable data carrier 20 and a computer 30. The end device 10 and the computer 30 respectively have an NFC interface, via which an NFC connection between the end device 10 and the computer 30 can be established. A login software is coupled with the NFC interface of the computer 30. In the end device 10 there is implemented a security operating system Mobicore with a secured runtime environment in which a login trustlet is implemented. The electronic national identity card nPA likewise has a contactless interface.

If a login (an access grant) to computer 30 is to be carried out on end device 10, in a preparatory step (arrow no. 1), first, via a contactless connection between the end device 10 and the electronic national identity card nPA 20, the end device 10 is loaded with a certificate valid for a limited time from the electronic national identity card nPA 20. The end device 10 is now ready for the login.

The login software of the computer 30 sends via the NFC interface polling messages as authentication invitations every minute. As soon as the end device 10 is brought from outside the capture region into the capture region of the NFC interface of the computer 30, the login software sends a polling message, provoked by this bringing in, as authentication invitation, so that the user does not have to wait until the next polling message. In reaction to the authentication invitation, the login trustlet sends the certificate as authentication data to the computer 30 (arrow no. 2).

The login software of the computer 30 checks the certificate and in the no-error case grants access to the computer, i.e. logs the user of the end device 10 in on the computer 30.

The user places the end device 10 beside the computer 30, whose login software continues to send polling messages as authentication invitations every minute. As long as the end device 10 is in the capture region of the computer 30, a successful authentication is carried out every minute and the access or login on the computer 30 is maintained. If in reaction to a polling message no or false authentication data are received at the computer 30, the access to the computer 30 is blocked.

As soon as the end device 10 is again in the capture region of the NFC interface of the computer 30, the access is granted again, i.e. the login is restored, assuming that this happens within the validity range of the certificate.

If the end device 10 is brought into the capture region of the NFC interface of the computer 30 outside the period of validity of the certificate, the login software of the computer 30 recognizes that the certificate is no longer valid and prevents the login. If the certificate expires, while the end device 10 is logged in on the computer 30, the end device 10 will be logged off and can only be logged on again, after a valid certificate has been reloaded into the end device 10.

The invention claimed is:

1. A method for access control to a computer by means of a mobile end device, wherein the mobile end device and the computer each comprise a contactless interface, wherein, using the contactless interfaces, an authentication to the computer is carried out with the mobile end device and upon a successful authentication the access to the computer is granted or maintained, wherein:

for preparing the authentication, a certificate is loaded into the mobile end device from a portable data carrier separate from the mobile end device;

for authentication, authentication data comprising the certificate or obtained from the certificate are made available to the computer from the mobile end device via the contactless interfaces, the authentication data being sent in response to an authentication invitation sent at an interval by the computer;

the certificate has a limited-time validity which is limited in time for a predetermined period of validity;

upon an attempt of authentication which is carried out outside the period of validity of the certificate, it is requested that a certificate is loaded into the mobile end device anew loaded from the portable data carrier into the mobile end device; and upon receiving an authentication invitation, the mobile end device is shifted from a power-saving first mode with restricted functionality of the mobile end device to a power-saving second mode with restricted functionality of the mobile end device in which at least the carrying out of the authentication is possible, the power-saving first mode having more restricted functionality than the power-saving second mode.

2. The method according to claim 1, wherein upon the receiving, by the contactless interface of the mobile end device, of an authentication invitation or of at least some authentication invitations by the contactless interface of the mobile end device, a user input is requested, wherein upon the entering of the requested user input into the mobile end device the authentication data are made available to the computer from the mobile end device.

3. The method according to claim 1, wherein the mobile end device comprises a secured runtime environment, and wherein the certificate is loaded into the mobile end device under management of the secured runtime environment and the authentication data are made available to the computer under the management of the secured runtime environment.

4. The method according to claim 1, wherein an electronic identification document is employed as a portable data carrier, and wherein the certificate is selectively created in the data carrier.

5. The method according to claim 1, wherein the making available of the authentication data by the mobile end device to the computer is prompted by an input at the mobile end device.

6. The method according to claim 1, wherein the power-saving first mode is a standby mode.

7. The method according to claim 1, wherein the power-saving second mode is a sleep mode in which the display of the mobile end device is switched off.

* * * * *